United States Patent [19]

Binder

[11] Patent Number: 6,079,403
[45] Date of Patent: Jun. 27, 2000

[54] DOOR FOR A HIGH-TEMPERATURE OVEN

[76] Inventor: Peter Michael Binder, Am Herrenholz 5, D-78359 Nenzingen, Germany

[21] Appl. No.: 09/293,523

[22] Filed: Apr. 15, 1999

[30] Foreign Application Priority Data

Apr. 18, 1998 [DE] Germany .......................... 198 17 371

[51] Int. Cl.[7] .............................. F23M 7/00; F24C 15/02
[52] U.S. Cl. ................. 126/190; 110/173 R; 29/525.11; 29/466
[58] Field of Search ................................ 126/190, 273 R; 110/173 R; 49/DIG. 1; 29/525.02, 525.11, 464, 466

[56] References Cited

U.S. PATENT DOCUMENTS

| | | | |
|---|---|---|---|
| 1,584,121 | 5/1926 | Moecker, Jr. et al. | 126/190 |
| 1,885,357 | 11/1932 | Kirby | 126/190 |
| 2,877,760 | 3/1959 | Swerman | 126/190 |
| 3,149,624 | 9/1964 | Reeves | 126/190 |
| 3,189,019 | 6/1965 | Pearce et al. | 126/190 |
| 3,189,020 | 6/1965 | Getman | 126/190 |
| 4,079,498 | 3/1978 | Blevins | 29/525.11 |
| 5,546,927 | 8/1996 | Lancelot | 126/190 |
| 5,735,261 | 4/1998 | Kieslinger | 126/190 |

FOREIGN PATENT DOCUMENTS

| | | |
|---|---|---|
| 0 496 243 A2 | 1/1992 | European Pat. Off. . |
| 4118800 | 8/1995 | Germany . |
| 562390 | 7/1944 | United Kingdom . |
| 1199760 | 7/1970 | United Kingdom . |
| 2 099 988 | 12/1981 | United Kingdom . |

*Primary Examiner*—Ira S. Lazarus
*Assistant Examiner*—Sara Clarke
*Attorney, Agent, or Firm*—Foley, Hoag & Eliot LLP

[57] ABSTRACT

A door for a high-temperature oven is disclosed that includes an external door and an internal door which are thermally isolated from one another. The internal door is held at a distance in a frame of the external door by internal door carriers. The internal door carriers are in the form of lugs that are integrally formed on the internal door by punching out the metal sheet. The lugs engage with tabs in the form of punched-out recessed that are disposed on the frame of the external door.

9 Claims, 4 Drawing Sheets

DOOR FOR A HIGH-TEMPERATURE OVEN

BACKGROUND OF THE INVENTION

1. Field of the Invention

This application relates to the field of high-temperature ovens and more particularly to the field of a door for a high-temperature oven.

2. Description of Related Art

High-temperature ovens, in particular laboratory high-temperature ovens, have an interior which can be heated to high temperatures. Drying ovens, for example, are operated with temperatures up to 300° C. In this connection, difficulties are presented, in particular, by the thermal insulation of the door of these appliances. While the inside of the door assumes the high temperature of the interior of, for example, up to 300° C., the outside of the door should remain as cold as possible, preferably under 50° C.

In known high-temperature ovens, the door therefore comprises an external door which is composed, for example, of galvanized powder-coated steel sheet and an internal door which is preferably composed of stainless-steel sheet. The external door and the internal door are thermally isolated as far as possible, for which purpose the thermally conducting contacts between the internal door and external door are kept as small as possible.

In the case of a high-temperature oven disclosed in DE 41 18 800 C3 of the generic class mentioned at the outset, the external door is folded for this purpose at its external periphery to form a casing-type circumferential frame. The internal door is inserted into the frame in such a way that a circumferential separating gap remains free between the external edge of the internal door and the frame of the external door. It is only the four corners that the internal door is joined to the frame of the external door by internal door carriers and held. The internal door carriers form the sole thermally conducting joint between internal door and external door. As a result of the small cross section of the internal door carriers, a very small thermally conducting contact is consequently produced between internal door and external door.

In the case of this known door, the internal door carriers are formed by metallic lugs which are screwed or welded, on the one hand, to the internal door and, on the other hand, to the external door. The screwing or welding of the metal lugs is an additional working step in the production of the high-temperature oven.

It is therefore desirable to improve a high-temperature oven of the generic class mentioned at the outset so that the production becomes less expensive while desirable properties are retained or improved.

SUMMARY OF THE INVENTION

In general, according to an aspect of the invention, the internal door carriers are formed integrally as lugs during the punching of the metal sheet for the internal door or the external door. When the internal door is inserted into the frame of the external door, the lugs engage in matching punched-out recesses in the mating door, i.e. in punched-out recesses in the external door if the lugs have been formed onto the internal door. This substantially simplifies the production of the door because the lugs formed on and the punched-out recesses for receiving the lugs can be produced during the punching-out of the sheet metal for the internal door and the external door in the same working operation. An additional working step to produce the internal door carriers is unnecessary. Equally unnecessary are additional working steps to fix the internal door carriers to the internal door and the external door.

In addition to these appreciable reductions in the production costs, an improvement is also achieved in the thermal isolation of internal door and external door. The lugs of the internal door carriers, which have only the material thickness of the metal sheet, are supported in the punched-out recesses of the mating door, for example in the external door, only by their narrow metal-sheet edges, no welded or screwed joint being present. The thermally conducting contact between internal door and external door is consequently reduced further.

To make possible a particularly simple assembly, the lugs are preferably formed onto the internal door. The lugs have a projecting tab and a supporting spacer edge. The lugs of the one side edge of the internal door are inserted by means of the tabs into tab holes of the frame of the external door so that the internal door is fixed to the side edge both perpendicularly with respect to the plane of the door and also in the plane of the door. Under these circumstances, the supporting spacer edge holds the internal door at a distance from the frame of the external door in order to produce the separating gap. At the opposite edge, the punched-out recesses are designed as closure slots so that the internal door can be swung into the casing of the frame of the external door, in which process the tabs of the lugs then enter the closure slots. Only a simple fastener is then necessary in order to fix the lugs in the closure slots and to prevent the internal door falling out of the frame of the external door. For the fastener, a simple internal door fastener formed as punched metal-sheet strip can be used which is attached with a single screw. To assemble the door, it is sufficient to insert the lugs of the internal door carrier of the one side edge into the associated lug holes of the frame, to swing the internal door into the external door and to fasten the swung-in lugs by means of the internal door fastener and to screw the two internal door fasteners securely with a single screw in each case.

Preferably, the lugs of the internal door fastener are formed onto the folded lateral external edge strip of the internal door, which has a beneficial effect on the stability of the internal door and its mounting in the external door.

BRIEF DESCRIPTION OF DRAWINGS

The foregoing and other objects and advantages of the invention will be appreciated more fully from the following further description thereof, with reference to the accompanying drawings wherein.

DETAILED DESCRIPTION OF PREFERRED EMBODIMENTS

Figure 1:
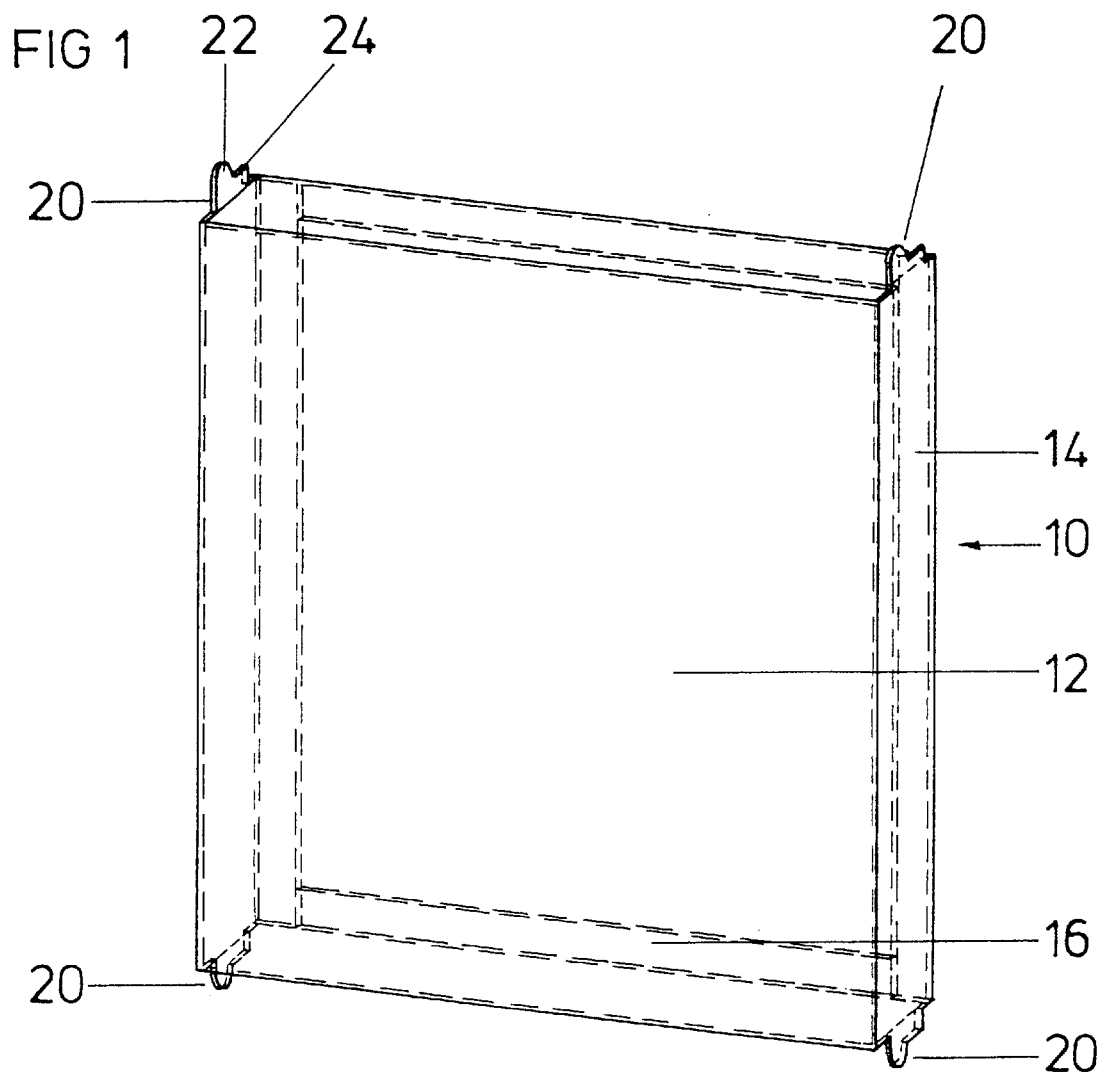
FIG. 1 shows a perspective view of an internal door according to the present invention.

A high-temperature oven, in particular a laboratory high-temperature oven, is constructed in a conventional manner and is therefore not shown in the drawings and is not described below. The present invention relates to the door of the high-temperature oven.

Figure 3:
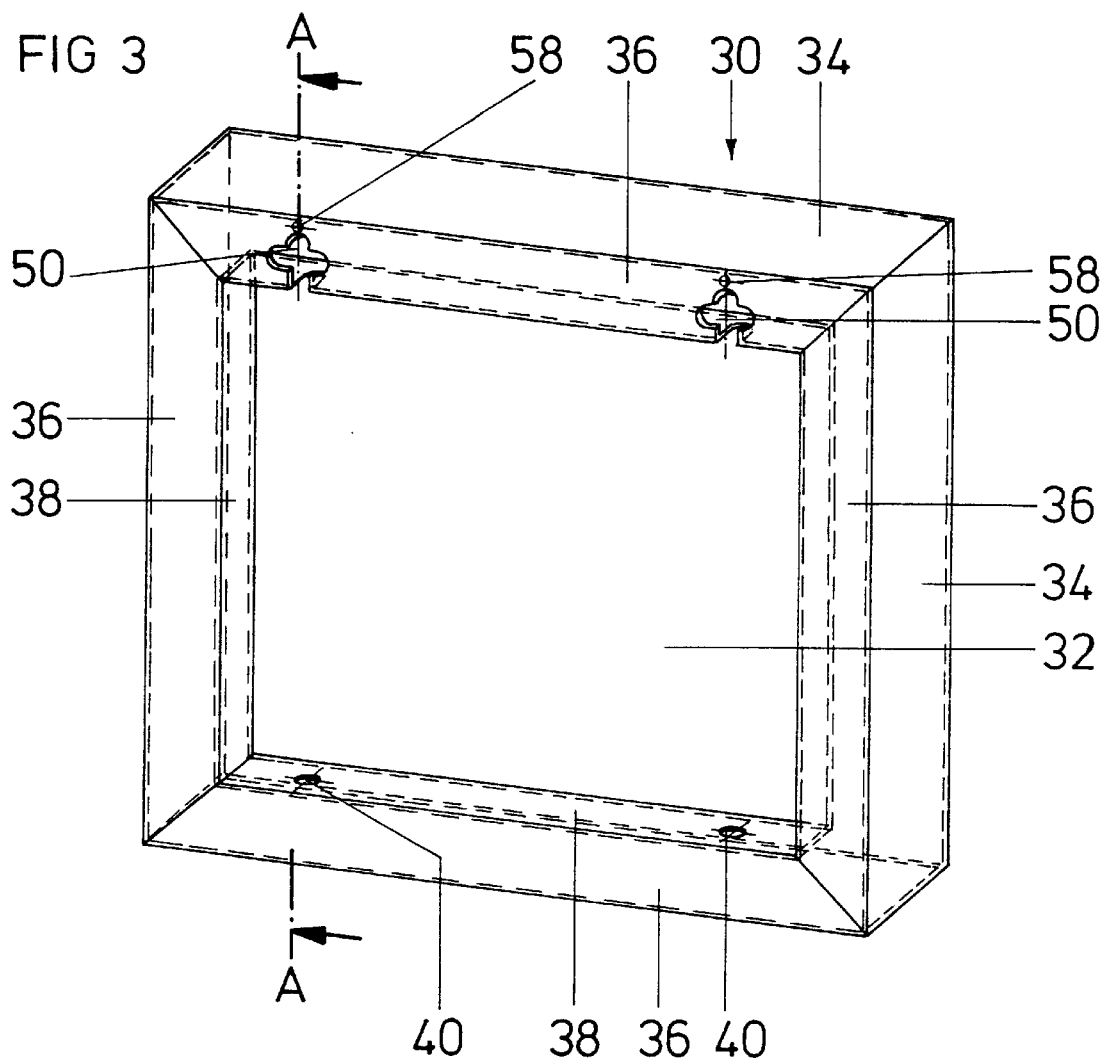
FIG. 3 shows a perspective view of an external door according to the present invention.

The door of the high-temperature oven is made up of an internal door 10 shown in FIG. 1 and an external door 30 shown in FIG. 3.

Figure 2:
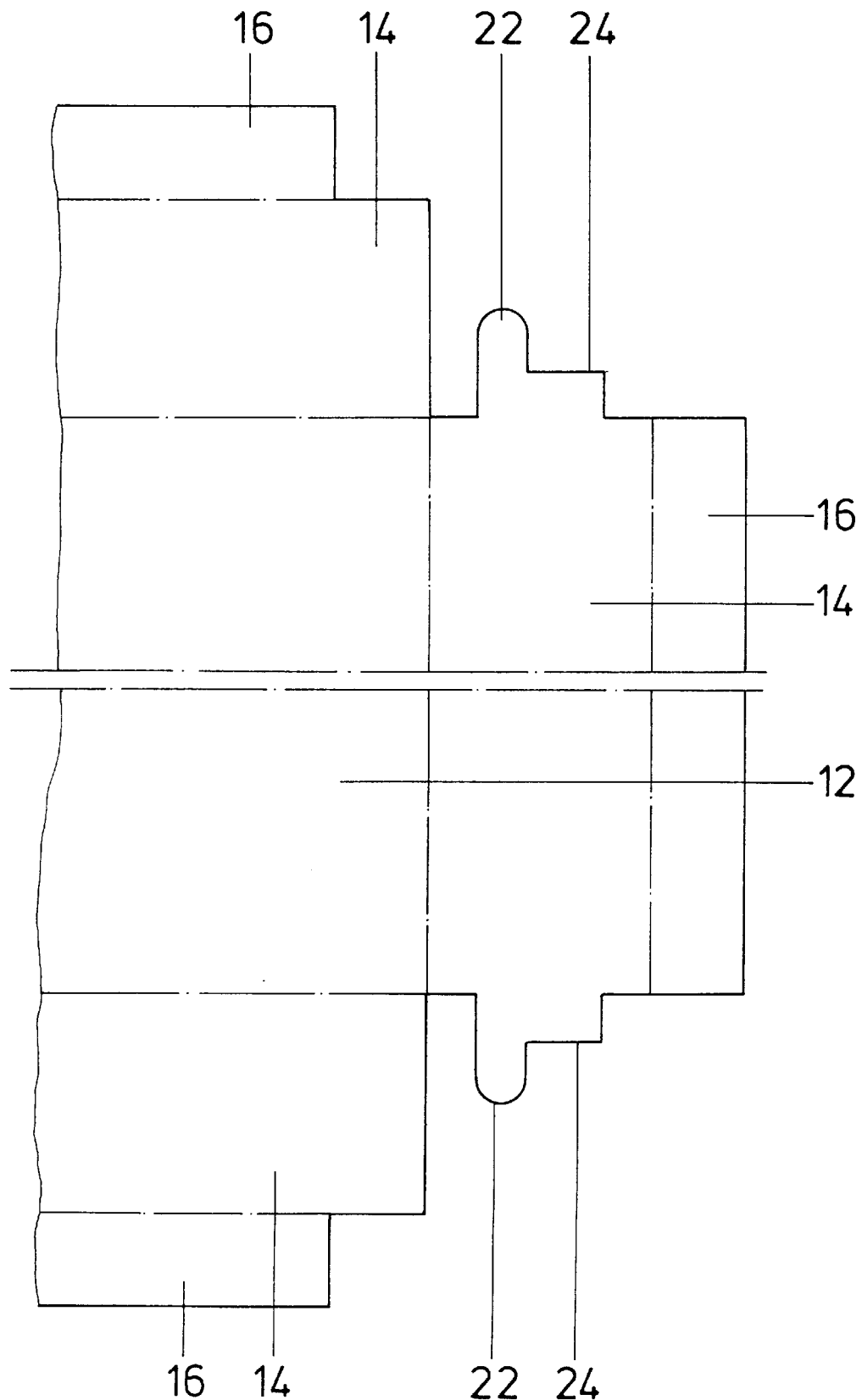
FIG. 2 shows a design of the metal-sheet punched part for production of the internal door.

The internal door 10 is made of stainless-steel sheet, an integral metal-sheet part first being punched, as is shown in FIG. 2. The metal-sheet part is folded so that a flat door leaf 12 is produced which closes the open side of the high-temperature oven. At the four side edges of the door leaf 12, an external edge strip 14 is bent away at right angles and its external edge is bent away further at right angles to form an internal edge strip 16, which consequently extends parallel again to the plane of the door leaf 12. The U-shaped profile formed by the door leaf 12, the external edge strips 14 and the internal edge strips 16 is used in a known manner to receive thermally insulating material (not shown).

At the two vertically extending external edge strips 14, an internal door carrier 20 is integrally formed on at the top and bottom in each case during the punching-out of the metal sheet part. The door carriers 20 are designed as lugs which continue upwards or downwards in the plane of the lateral external edge strips 14. The lugs have a tab 22 which projects vertically upwards or downwards and which is adjoined by a supporting spacer edge 24. The supporting spacer edge 24 extends parallel to the upper or lower external edge strip 14 of the internal door 10 and is disposed with respect to the upper or lower edge strip 14 at a distance which, in a manner described later, defines the width of a separating gap 18 between the internal door 10 and the external door 30.

Figure 6:
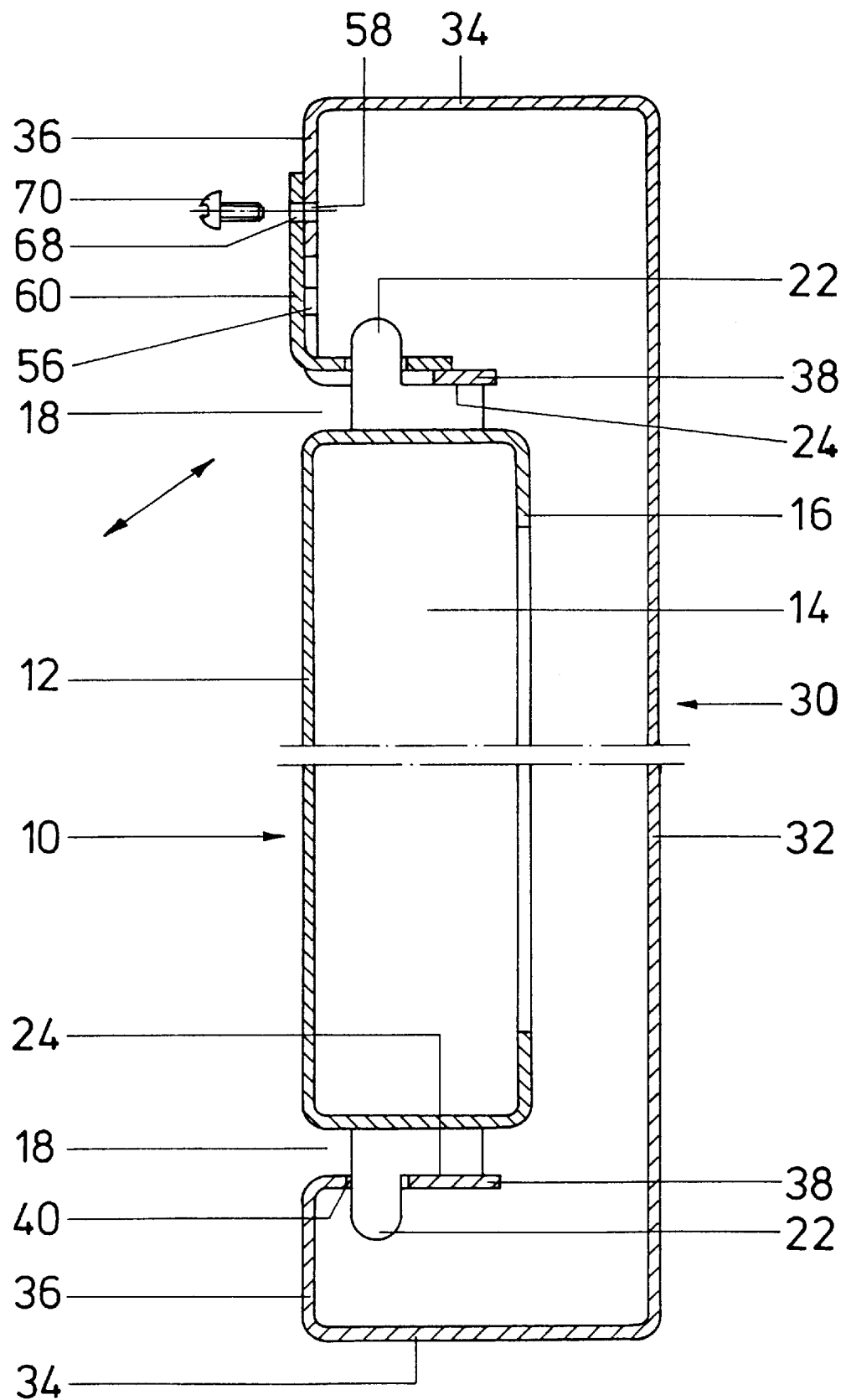
FIG. 6 shows a vertical section through an assembled door according to the present invention along the sectioning line A—A in FIG. 3.

The external door 30 shown in FIG. 3 is likewise punched and bent integrally out of a steel sheet. The external door 30 has a door leaf 32 which has larger side dimensions than the door leaf 12 of the internal door 10. Formed on the oven-side surface of the external door 30 is a circumferential frame. For this purpose, an external frame edge 34 is first bent away at right angles on the external edges of the door leaf 32 of the external door 30. The external edge of the frame edge is again folded inwards at right angles to form an oven-side frame edge 36 and finally, its edge is again folded inwards at right angles to form an internal frame edge 38 which consequently again extends perpendicularly with respect to the plane of the door leaf 32. The door leaf 32, the external frame edge 34, the oven-side frame edge 33 and the internal frame edge 38 consequently form a square profile which forms a circumferential frame at the periphery of the door leaf 32. The internal dimensions of the frame are somewhat greater than the external dimensions of the internal door 10, with the result that, when the internal door 10 is inserted into the frame of the external door 30, a separating gap 18 remains free between the internal frame edge 38 of the external door 30 and the external edge strip 14 of the internal door 10, as indicated in FIG. 6.

When the metal-sheet part of the external door 30 is punched, a tab hole 40 is punched out at each of the two corners in the internal frame edge 38 of the lower edge of the external door 30. The tab holes 40 are disposed so that, after the frame has been bent, they are each at a lateral distance from the adjacent, vertically extending internal frame edge 38, which distance corresponds to the width of the separating gap 18.

Figure 4:
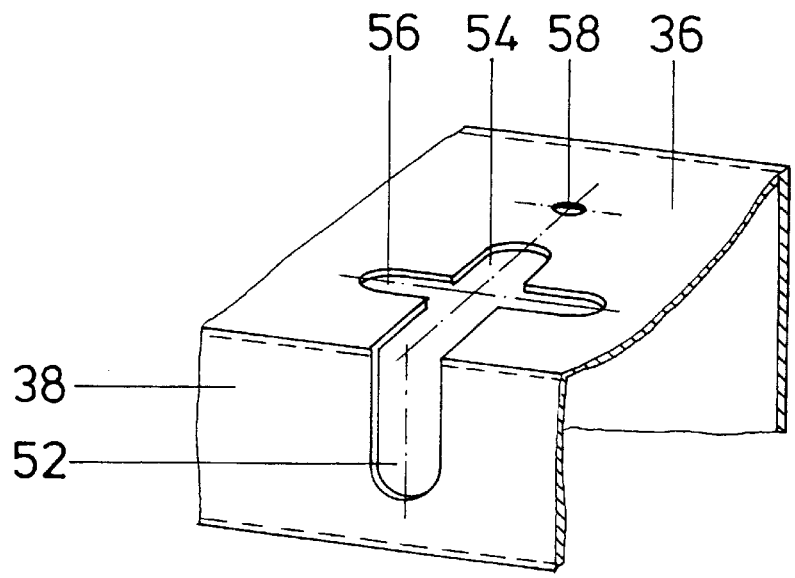
FIG. 4 shows in detail a design of a closure slot of the external door.

When the metal-sheet part of the external door 30 is punched, two closure slots 50 are furthermore punched out in the region which is bent to form the oven-side frame edge 36 and the internal frame edge 38 of the upper side edge of the external door 30. As can be seen in FIG. 3 and, in particular, FIG. 4, the closure slots 50 extend perpendicularly with respect to the bending edge that joins the oven-side frame edge 36 to the internal frame edge 38. In this connection, an internal section 52 of the closure slots 50 extends in the internal frame edge 38, while an external section 54 extends in the oven-side frame edge 36. Approximately in the center of the external section 54, a transverse slot 56 is additionally punched out which extends perpendicularly with respect to the closure slot 50, i.e. parallel to the bending edge, and extends symmetrically with respect to the closure slot 50. Finally, a screw hole 58 is punched out in each case in the surface of the oven-side frame edge 36 which is axially in line with the external section 54 of the closure slots 50. Each of the closure slots 50 are disposed so that, after the frame of the external door 30 has been bent, they are at a lateral distance from the respective adjacent vertical internal frame edge 38, which distance corresponds to the width of the separating gap 18.

When the door is assembled, the internal door 10 shown in FIG. 1 is inserted into the frame of the external door 30. For this purpose, the lugs 22 of the internal door carriers 20 at the lower side of the internal door 10 are first inserted into the tab holes 40 of the lower side of the external door 30. In this connection, the width of the tabs 22 perpendicularly with respect to the plane corresponds to the diameter of the tab holes 40. The tabs 22 are consequently held in the tab holes 40 both against a displacement perpendicularly with respect to the plane of the door and against a lateral displacement in the plane of the door. When the tabs 22 are inserted into the tab holes 40, the supporting spacer edges 24 of the lower internal door carriers 20 are seated on the internal frame edge 38 of the lower side of the external door 30. Consequently, the lower external edge strip 14 of the internal door 10 is held at the distance corresponding to the width of the separating gap 18 from the internal frame edge 38 of the lower side of the external door 30. In addition, the arrangement of the tab holes 40 determines the distance between the vertical external edge strips 14 of the internal door 10 and the vertical internal frame edges 38 of the external door 30 and fixes the width of the separating gap 18. Finally, the distance of the tabs 22 from the plane of the door leaf 12 of the internal door 10 and the distance of the tab holes 40 from the plane of the oven-side frame edge 36 of the external door is determined so that, after the internal door 10 is inserted into the frame of the external door 30, the door leaf of the internal door 10 is in the plane of the oven-side frame edge 36 of the external door 30.

After the tabs 22 of the lower edge of the internal door 10 have been inserted into the tab holes 40, the internal door is swung by means of its upper edge into the frame of the external door 30, as is indicated in FIG. 6 by the double arrow. In this operation, the tabs 22 of the internal door carriers 20 at the upper edge of the internal door enter the internal sections 52 of the closure slots 50 through the external sections 54 of the closure slots 50. The tabs 22 come to a stop at the internal end of the internal sections 52. The supporting spacer edges 24 of the internal door carriers 20 are up against the upper internal frame edge 38 so that the separating gap 18 of the specified width is also formed between the upper internal frame edge 38 of the external door 30 and the upper external edge strip 14 of the internal door 10.

Figure 5:
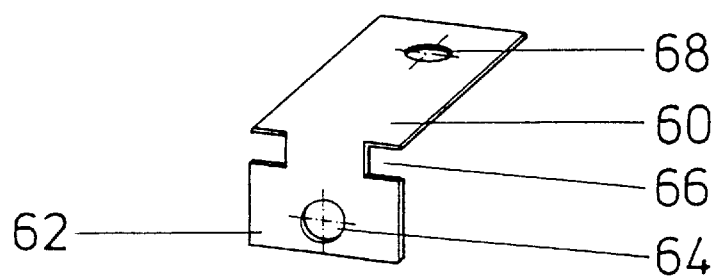
FIG. 5 shows a perspective view of a fastener for the internal door.

In order to lock the tabs 22 in the closure slots 50 and to prevent the internal door 10 tipping out of the frame of the external door 30, internal door fasteners 60 are provided, one of which is shown in FIG. 5. The internal door fasteners 60 comprise a metal-sheet strip which is folded at one end at right angles to form a locking section 62. The width of the internal door fastener 60 corresponds to the width of the transverse slot 56. In the folded locking section 62, a tab hole 64 is punched out whose diameter corresponds to the width of the tabs 22. A constriction 66 is punched out of the locking section 62 adjacent to the bending edge so that the width of the locking section 62 is reduced in the region of the constriction 66 to the width of the closure slot 50. Finally, a screw hole 68 is punched out in addition in that end of the internal door fastener 60 which is opposite the locking section 62.

To lock the internal door 10 in the frame of the external door 30, the locking section 62 of the internal door fastener 60 is pushed into the oven-side frame edge 36 through the transverse slot 56. As soon as the internal door fastener 60 is flatly up against the internal frame edge 38, the internal door fastener 60 can be pushed downwards, in which operation the constriction 66 of the locking section 62 travels in the external section 54 of the closure slot 50. At the same time, the tab hole 64 of the locking section 62 is pushed over the tab 22 of the internal door carrier 20. Once the internal door fastener 60 has been pushed fully downwards so that the locking section 62 rests internally on the internal frame edge 38, the locking section 62 is fixed by the constriction 66 in the oven-side frame edge 36 and the tab hole 64 fixes the tab 22. In this position, the screw hole 68 of the internal door fastener 60 is aligned with the screw hole 58 of the oven-side frame edge 36 and the internal door fastener 60 is attached by means of a metal screw 70 which passes through the screw hole 68 and is screwed into the screw hole 58.

The thermally conducting contact between the internal door 10 and the external door 30 is limited to the minimal surface region at which the narrow edges of the tabs 22 and the supporting spacer edges 24 of the internal door carriers 20 are up against the internal frame edge 38. The internal door carriers 20 are not welded or screwed to the internal frame edge 38.

Optionally, a viewing window may be inserted into the internal door 10 and the external door 30 in a manner known in the art.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

I claim:

1. A door for a high-temperature oven, comprising:
    an external door having a first door leaf formed of sheet metal and comprising an edge, wherein the edge is folded inwards to form a circumferential frame;
    an internal door formed of sheet metal and having a second door leaf with an outer edge, the internal door adapted to be inserted into the frame of the external door, wherein the outer edge of the internal door is spaced apart from the frame of the external door by a circumferential separating gap; and
    a plurality of internal door carriers which join the internal door to the frame of the external door and support the internal door in the external door, wherein the internal door carriers are in the form of lugs which are integrally formed by punching out the sheet metal of at least one of the internal door and the external door and wherein the lugs engage in corresponding punched-out recesses formed in the other of the external door and the internal door, respectively,
    wherein the internal door carriers are formed on the internal door and the punched-out recesses are formed on the frame of the external door, and
    wherein the internal door comprises external edge strips bent away at right angles to the first door leaf and wherein the internal door carriers are formed onto the external edge strips.

2. A door for a high-temperature oven, comprising:
    an external door having a first door leaf formed of sheet metal and comprising an edge, wherein the edge is folded inwards to form a circumferential frame;
    an internal door formed of sheet metal and having a second door leaf with an outer edge, the internal door adapted to be inserted into the frame of the external door, wherein the outer edge of the internal door is spaced apart from the frame of the external door by a circumferential separating gap; and
    a plurality of internal door carriers which join the internal door to the frame of the external door and support the internal door in the external door, wherein the internal door carriers are in the form of lugs which are integrally formed by punching out the sheet metal of at least one of the internal door and the external door and wherein the lugs engage in corresponding punched-out recesses formed in the other of the external door and the internal door, respectively,
    wherein the internal door carriers are formed on the internal door and the punched-out recesses are formed on the frame of the external door,
    wherein the internal door comprises four corners, with an internal door carrier disposed at each of the four corners of the internal door, and
    wherein two of the four internal door carriers project parallel to one another perpendicularly from one side edge of the internal door and the other two internal door carriers project perpendicularly from the opposite parallel side edge.

3. A door for a high-temperature oven, comprising:
    an external door having a first door leaf formed of sheet metal and comprising an edge, wherein the edge is folded inwards to form a circumferential frame;
    an internal door formed of sheet metal and having a second door leaf with an outer edge, the internal door adapted to be inserted into the frame of the external door, wherein the outer edge of the internal door is spaced apart from the frame of the external door by a circumferential separating gap; and
    a plurality of internal door carriers which join the internal door to the frame of the external door and support the internal door in the external door, wherein the internal door carriers are in the form of lugs which are integrally formed by punching out the sheet metal of at least one of the internal door and the external door and wherein the lugs engage in corresponding punched-out recesses formed in the other of the external door and the internal door, respectively,
    wherein the internal door carriers are formed on the internal door and the punched-out recesses are formed on the frame of the external door,
    wherein each of the internal door carriers comprises a tab, which engages in the corresponding punched-out recess of the external door, and a spacer element which holds the internal door at a distance corresponding to the circumferential separating gap from the frame of the external door, and wherein the spacer element is a supporting spacer edge which is formed on the lug of the internal door carrier and which is supported against a displacement of the internal door on the frame of the external door.

4. A door for a high-temperature oven, comprising:

an external door having a first door leaf formed of sheet metal and comprising an edge, wherein the edge is folded inwards to form a circumferential frame;

an internal door formed of sheet metal and having a second door leaf with an outer edge, the internal door adapted to be inserted into the frame of the external door, wherein the outer edge of the internal door is spaced apart from the frame of the external door by a circumferential separating gap; and a plurality of internal door carriers which join the internal door to the frame of the external door and support the internal door in the external door, wherein the internal door carriers are in the form of lugs which are integrally formed by punching out the sheet metal of at least one of the internal door and the external door and wherein the lugs engage in corresponding punched-out recesses formed in the other of the external door and the internal door, respectively, wherein the internal door carriers are formed on the internal door and the punched-out recesses are formed on the frame of the external door, wherein each of the internal door carriers comprises a tab, which engages in the corresponding punched-out recess of the external door, and a spacer element which holds the internal door at a distance corresponding to the circumferential separating gap from the frame of the external door, and wherein the tabs of the internal door carriers which are disposed on a first side edge of the internal door, can be inserted into tab holes which are disposed on a corresponding internal frame edge of the external door, and wherein the tabs of the internal door carriers which are disposed on the side edge opposite from the first side edge of the internal door, can be swung into corresponding closure slots which are disposed on a frame edge of the frame of the external door that faces the oven and in the internal frame edge of the frame of the external door.

5. The door according to claim 4, wherein the internal door carriers that can be swung into corresponding closure slots, can be locked in the frame of the external door by an internal door fastener.

6. The door according to claim 5, wherein the internal door fastener can be fixedly attached to the external frame and firmly holds the tabs of the internal door carrier.

7. A door for a high-temperature oven, comprising:

an external door forming a circumferential first frame;

an internal door forming a circumferential second frame and adapted for insertion into the first frame so as to leave a circumferential separating gap between the first frame and the second frame;

a plurality of integrally formed lugs disposed on at least one of the internal door and the external door, wherein the lugs engage in corresponding recesses formed in the other of the external door and the internal door, respectively; and at least one door fastener cooperating with a corresponding recess and adapted to receive a corresponding lug, wherein a cutout provided in the door fastener engages behind a slot provided in the recess to prevent the door fastener from being pulled out of the recess after the lug is inserted into the door fastener.

8. The door according to claim 7, wherein the door fastener is secured to the door having the recesses with a fastener.

9. The door The door according to claim 8, wherein the door having the recesses comprises a thread and the fastener is a screw.

\* \* \* \* \*